UNITED STATES PATENT OFFICE.

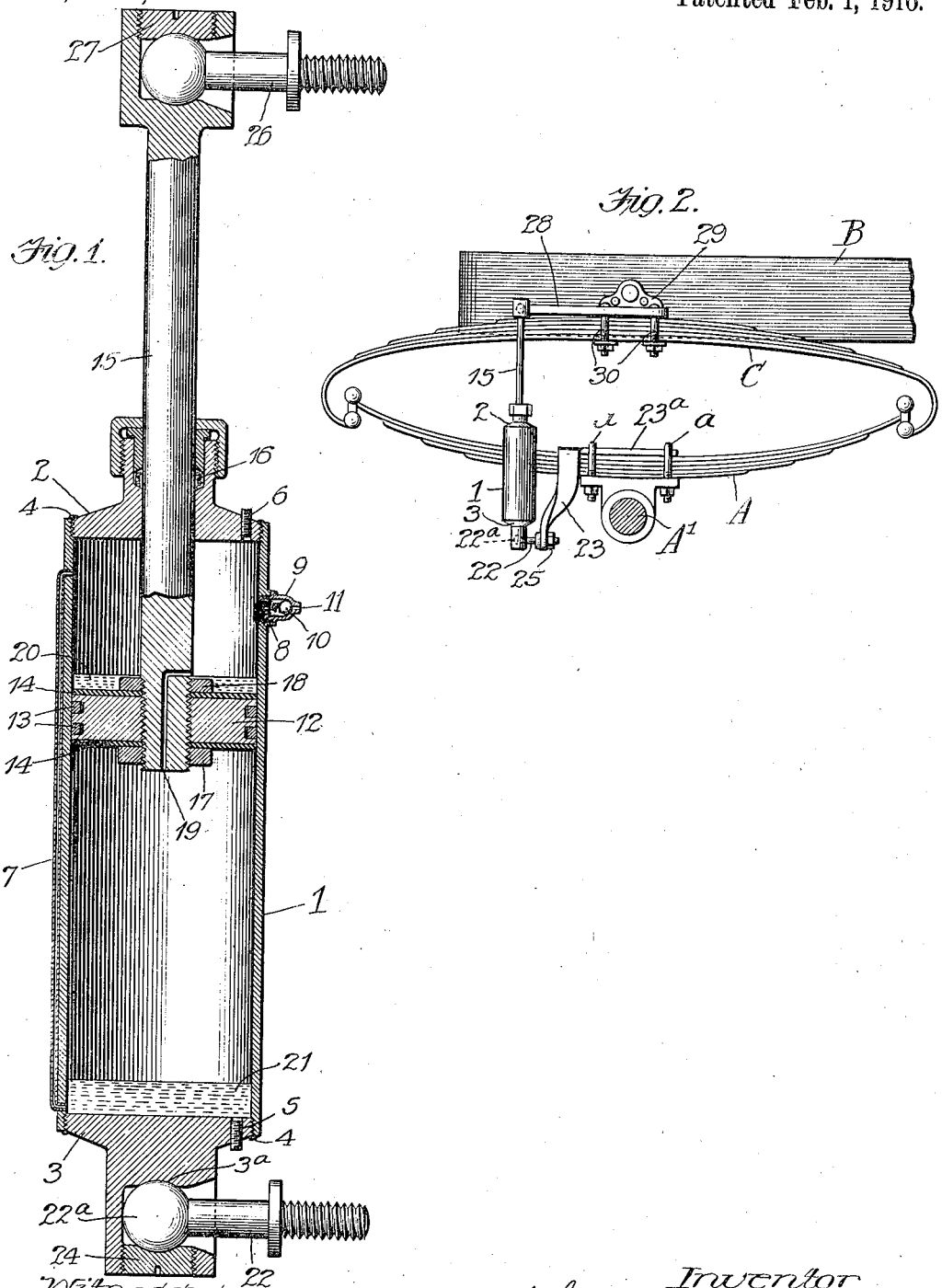

JOHN A. DOXEY, OF CHICAGO, ILLINOIS.

SHOCK-ABSORBER.

1,170,226.  Specification of Letters Patent.  Patented Feb. 1, 1916.

Application filed April 27, 1914. Serial No. 834,737.

*To all whom it may concern:*

Be it known that I, JOHN A. DOXEY, a citizen of the United States, residing at Chicago, in the county of Cook and State of Illinois, have invented certain new and useful Improvements in Shock-Absorbers, of which the following is a specification.

My invention relates to a shock absorber for vehicles, more particularly for automobiles and the object thereof is to provide a simple, efficient and reliable absorber operating on the air principle.

Speaking in general terms, my shock absorber comprises a cylinder connected with one member of the vehicle such as the lower spring and axle and having a piston connected with another member of the vehicle such as the chassis frame and upper spring member, in case the spring is of the full elliptic, semi-elliptic or three-quarter elliptic, the particular type or character of spring being immaterial. My shock absorber is also provided with means for thoroughly lubricating the piston and walls of the cylinder with oil as an incident to the movements of the piston and its cylinder in the regular operation of the shock absorber.

In the drawings Figure 1 is a central vertical sectional elevation of my shock absorber and Fig. 2 a side view of a part of an automobile structure and its springs showing my shock absorber in position.

Referring to the embodiment of my invention as herein shown my shock absorber comprises a cylinder 1 of suitable length and diameter according to the work to be done, that is according to the weight of the automobile and provided with an upper head 2 and a lower head 3 which are secured to the ends of the cylinder in suitable manner as by screw threading, after which the joints at the screw threads are soldered or brazed over as shown at 4 in order to prevent any leakage through the screw threads. The lower head is provided with a drain opening closed by a screw plug 5 and the upper head is provided with a supply opening closed by a screw plug 6, these openings being provided for the admission of oil and the draining of the same respectively whenever desired. This cylinder is provided along one side with a by-pass 7 extending from near the upper end of the cylinder to a point substantially at the bottom thereof. The upper end of the cylinder is provided with an air inlet opening 8 formed in a valve casing 9 in which is arranged a suitable check valve such as a ball 10 normally spring-pressed against the air inlet opening 11. The purpose of this valve-controlled inlet is to supply additional air to compensate for any leakage of air from the shock absorber during the operation thereof.

Within the cylinder there travels a piston 12 which is well packed in suitable manner as by means of the piston rings 13 and the gaskets 14 of leather or equivalent material placed on opposite sides of the piston. This piston is provided with a rod 15 which extends through a packing box 16 formed in the upper head 2 and is secured at its inner end to the piston. In the present instance this end of the piston rod is screw-threaded, screwing centrally through the piston and held thereto by means of the two nuts 17 and 18 located on opposite sides of the piston. The piston rod is provided with a by-pass 19 between such opposite sides of the piston, such by-pass extending centrally for a part of the way through the inner end of the piston-rod and thence laterally to the side of the rod where it emerges at a point above the nut 18. By this arrangement a shallow body of oil indicated at 20 is permitted on the top face of the piston and any overflow passes through the by-pass to the bottom of the cylinder where another body of oil indicated at 21 collects.

The shock absorber as thus described may be connected in any suitable manner to the proper parts of the vehicle. In the present instance I have shown the lower head of the cylinder connected by means of a bolt 22 with a bracket 23 whose horizontal portion 23ᵃ is secured to the axle and to the lower section A of the spring by the usual clips $a$ which also serve to hold the leaves of the spring together and in place upon the axle structure A' as indicated in Fig. 2. The bolt 22 has a ball and socket connection with the head 3 to which end the bolt has a ball 22ᵃ and the head a socket 3ᵃ, the parts being held against withdrawal by means of the screw plug 24. By preference the bolt 22 has a screw-threaded outer end passing through the bracket 23 and removably held in place by means of the nut 25.

The piston rod is provided with a bolt 26 similar to the bolt 22 and having a ball and socket connection therewith together with a screw plug 27. The bolt 26 is screw-threaded into one end of a horizontal bracket 28 which is here shown as a part of the bracket 29 secured to the frame B of the chassis, being the same bracket to which the upper spring section C is secured by means of the clips 30.

While in the present instance I have shown my shock absorber as applied to a spring of the full elliptic type, it will be understood that its application is not limited thereto but that it may be applied to the semi-elliptic or three-quarter elliptic as well. By preference the shock absorber is applied to the springs at a point toward their middle portions as indicated in Fig. 2.

My shock absorber being a construction as above described operates as follows: Upon the downward movement of the body and chassis frame B due to a jolt or unevenness in the road the piston rod 15 and its piston 12 will be forced downwardly by the rod and weight of the vehicle but as the piston is a closed one the air below the piston will be compressed by the downward movement of the piston, it being understood that the passage 19 is of such small carrying capacity that it cannot pass the air to produce equilization on opposite sides of the piston. In the downward movement of the piston and the consequent compression of the air below it a small quantity of the oil in the bottom of the cylinder will be forced upwardly through the by-pass 7 and be ejected into the space above the piston and onto the upper face thereof, thereby always keeping a small supply or pool of oil 21. The shock absorber tends to restore the body and chassis to normal position relative to the axle structure and tends to resist any upward movement beyond the normal in the same manner as on the down stroke of the piston inasmuch as the latter on its upward movement beyond normal position compresses the air in the upper end of the cylinder. In case of any leakage of air from within the cylinder to compensate for such loss the valve 10 will open and admit the necessary amount of air through the inlet port 11. In this manner and by these means the quick and violent movements and jolts imparted to the springs are absorbed and the springs thereby relieved. At the same time during the movements of the piston the walls of the cylinder are automatically kept lubricated and a supply of oil is constantly maintained in an automatic manner on the top face of the piston with the result that the piston is at all times kept packed against any possible leakage.

I claim:

1. A shock absorber comprising a closed cylinder having a by-pass between its upper and lower ends, a piston in the cylinder having a minute open leak-pass between its opposite sides, and a charge of oil incompletely filling the lower end of the cylinder.

2. A shock absorber comprising a cylinder having a by-pass between its upper and lower ends, and a piston therein having an always open by-pass between its opposite sides whose upper end communicates with the cylinder at a point slightly above the top of the piston to thereby permit oil to collect in a pool on top of the piston and to overflow through said by-pass.

3. A shock absorber comprising a closed cylinder having a by-pass between its upper and lower ends, and a piston in the cylinder provided with a rod having an always open by-pass between opposite sides of the piston, said latter by-pass communicating at its upper end with the cylinder at a point slightly above the top of the piston.

4. A shock absorber comprising a cylinder having a by-pass leading from the extreme lower end thereof to a point near the top of the same, a piston in said cylinder having restricted communication between its opposite sides permitting leakage, and a charge of oil normally standing in the bottom of the cylinder a short distance above the level of the lower end of the by-pass, a relatively large space above the oil and below the piston constituting an air chamber.

5. A shock absorber comprising a cylinder having a by-pass leading from the extreme lower end thereof to a point near the top of the same, a piston in said cylinder provided with packing arranged around its periphery and having a minute open leak-pass between its opposite sides whose upper end communicates with the space above the piston at a point slightly above the top of such piston to permit oil to collect in a pool on top of the piston and an overflow to drain through such leak-pass, and a charge of oil normally standing in the bottom of the cylinder a short distance above the level of the lower end of the by-pass, a relatively large space above the oil and below the piston constituting an air chamber.

JOHN A. DOXEY.

Witnesses:
Louis B. Erwin,
Robert Dobberman.